United States Patent [19]

Sullivan

[11] 4,108,401

[45] Aug. 22, 1978

[54] MOTOR MOUNT FOR USE IN MODEL AIRPLANE

[75] Inventor: Matthew A. Sullivan, Elkins Park, Pa.

[73] Assignee: Sullivan Products, Inc., Willow Grove, Pa.

[21] Appl. No.: 748,339

[22] Filed: Dec. 7, 1976

[51] Int. Cl.² .................... B64D 27/00; F16M 13/00
[52] U.S. Cl. ................... 244/54; 46/76 R; 46/78; 180/64 R; 248/5; 248/310; 248/500
[58] Field of Search ............. 244/54; 46/74 R, 76 R, 46/78; 180/64 R, 64 L; 248/3, 5, 25, 226.1, 310, 316 R, 316 D, 500, 510, 507, 508, 509; 269/91, 94, 134, 296

[56] References Cited

U.S. PATENT DOCUMENTS

| | | | |
|---|---|---|---|
| 1,372,459 | 3/1921 | Schwarz | 269/134 |
| 3,059,879 | 10/1962 | Tatone | 46/78 |
| 3,190,593 | 6/1965 | Kreger | 248/25 |
| 3,752,246 | 8/1973 | Sullivan | 180/64 R |
| 3,891,169 | 6/1975 | Tremarco | 248/5 |

Primary Examiner—Trygve M. Blix
Assistant Examiner—Charles E. Frankfort
Attorney, Agent, or Firm—Seidel, Gonda & Goldhammer

[57] ABSTRACT

A motor mount for use in model airplanes is disclosed. The motor mount includes a mounting plate and a pair of spaced arms extending generally perpendicularly from the mounting plate. Each arm includes a generally horizontal surface for supporting flanges of a motor or engine and an angled surface spaced above and sloping toward the horizontal surface. A clamping plate is secured to each of the angled surfaces. Each clamping plate secures a flange of the motor to one of said horizontal surfaces. The clamping plates can be secured to one of a plurality of locations along the longitudinal dimension of each arm.

11 Claims, 4 Drawing Figures

U.S. Patent    Aug. 22, 1978    4,108,401
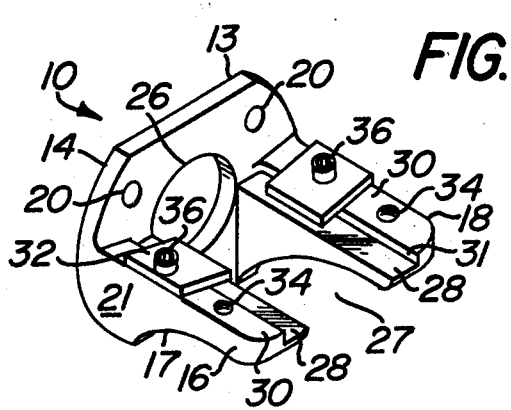
FIG. 1
FIG. 2
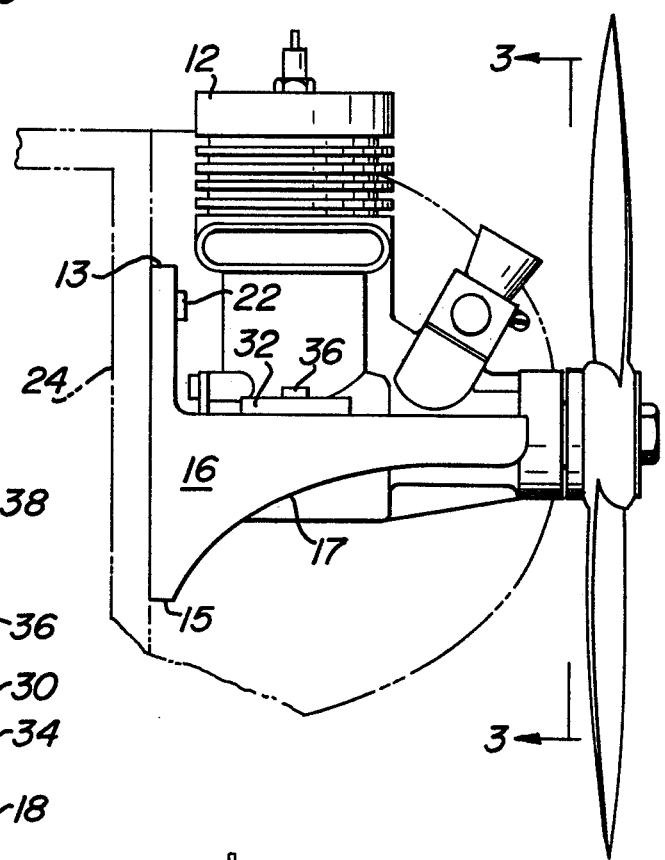
FIG. 4
FIG. 3

MOTOR MOUNT FOR USE IN MODEL AIRPLANE

BACKGROUND OF THE INVENTION

The present invention relates to the mounting of motors to model airplanes and the like. A variety of methods and devices have heretofore been used to mount engines to model airplanes.

In one method, the engine is mounted directly to the firewall of an airplane. In another method, various mounts or spacers are utilized to mount the engine to the firewall. Engines mounted in accordance with the above methods generally are not readily interchangeable with other sized engines. Also, engines mounted in accordance with prior art methods are subject to excessive vibration. The use of prior art methods also does not permit the position of the engine to be readily adjusted.

A motor mount of the general type disclosed herein is shown in U.S. Pat. No. 3,752,246.

BRIEF SUMMARY OF THE INVENTION

The motor mount of the present invention includes a pair of spaced arms, which extend outwardly from a mounting plate. A means is provided for securing various sized motors or engines at one of a plurality of locations along the lengthwise dimension of the arms.

In the preferred embodiment, the arms extend at generally right angles from the mounting plate and are generally parallel to one other. Each arm has a generally horizontal surface and an angled surface spaced above and sloping toward the horizontal surface. Clamping plates are provided for securing flanges of a motor or engine between the clamping plates and the horizontal surfaces. The clamping plates can be secured to the angled surfaces at one of a plurality of locations along each surface.

By using angled surfaces sloping toward the horizontal surfaces, various thicknesses of flanges can be secured between the clamping plates and the horizontal surfaces. Hence, different sized engines with flanges of various thicknesses can be held within the mount. Also, by permitting the clamping means to be secured to one of a plurality of positions on the arms, the balancing of a model airplane is greatly simplified.

It is an object of the invention to provide a motor mount for use with model airplanes which provides a sturdy and reliable means for mounting an engine to the airplane.

It is another object of the invention to provide a motor mount which allows an engine to be positioned at one of a plurality of locations on the mount.

It is another object of the invention to provide a motor mount capable of supporting a variety of engine sizes.

Other objects will appear hereinafter.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 1 is a perspective view of a motor mount in accordance with the present invention.

FIG. 2 is a side elevational view of the motor mount with a model airplane engine mounted thereon.

FIG. 3 is a sectional view taken along line 3—3 of FIG. 2.

FIG. 4 is a top plan view of the motor mount with an engine mounted thereon.

DETAILED DESCRIPTION OF THE INVENTION

Referring to the drawings in detail, wherein like numerals indicate like elements, there is shown in FIG. 1 a perspective view of a motor mount generally indicated by the reference numeral 10. As seen in FIGS. 2-4, the motor mount 10 is designed to hold a model airplane motor or engine 12.

The motor mount 10 is comprised of a mounting plate 14 and a pair of arms 16, 18 extending therefrom. The mounting plate 14 has holes 20 extending completely therethrough. Fastening means, such as screws or bolts 22, pass through the holes 20 and secure the motor mount 10 to a portion of a model airplane, such as firewall 24.

The mounting plate 14 also has a large centrally disposed hole 26 extending therethrough. The mounting plate 14 is provided with the hole 26 in order to reduce the total weight of the mount 10. The mounting plate 14 is preferably of a circular or curvilinear configuration with a pair of flats 13, 15 formed at the top and bottom of the plate 14. The mount 10 can be made of any suitable lightweight and sturdy material. However, in the preferred embodiment, the entire mount 10 is constructed of a single piece of cast aluminum.

The arms 16, 18 extend generally at right angles from the mounting plate 14 and are generally parallel to one another. The arms 16, 18 are also spaced apart from one another so as to form a space or slot 27 between them. The engine 12 is received within the slot 27.

In the preferred embodiment, the cross sectional area of each arm 16, 18 is greatest adjacent the mounting plate 14 and decreases in a direction extending away from the mounting plate 14. The bottom surfaces 17 of the arms 16, 18 curve from the bottom flat 15 to the tip of the arms 16, 18. The outer surfaces 21, 23 of the arms 16, 18 are also curved and have the center of their radius of curvature at the center of the hole 26.

The arms 16, 18 are similar in construction and hence only one arm 16 will be described in detail. Like numerals will indicate like features of the arms 16, 18.

The arm 16 has a generally horizontally disposed surface 28. An angled surface 30 is spaced above the surface 28 and slopes toward the surface 28. The surface 28 is preferably located at the center of the vertical dimension of the mounting plate 14. An upright surface 31 interconnects surface 28 with surface 30. A clamping plate 32 is removably secured to the surface 30. The arm 16 has a plurality of threaded holes 34 passing therethrough. One hole 34 is shown in the arm 16 while another hole 34 is concealed by the clamping plate 32. The clamping plate 32 is secured to the angled surface 30 by screws, such as Allen screws 36, which thread into a hole 34.

A typical engine 12 has a pair of flanges 38 extending therefrom. The horizontal surfaces 28 support the bottom surfaces of the flanges 38. The clamping plates 32 are tightened down onto the top surface of the flanges 38 by tightening screws 36. The engine 12 is thus secured to the mount 10. Since the surface 30 is angled toward the surface 28, flanges 38 having a variety of thicknesses can be secured to the arms 16, 18 by the clamping plates 32. Thus, various sized engines can be secured to the mount 10. The motor mount 10 is preferably made in two sizes. One size of the motor mount 10 can accommodate engines approximately up to a standard size 0.44 engine, while a second size of motor mount 10 can accommodate engines approximately between sizes 0.45 and 0.60 inclusive. Since the clamping plates 32 can be readily removed by loosening the screws 36, engines can be easily replaced and interchanged.

Each arm 16, 18 has a plurality of threaded holes 34 to which the clamping plates 32 can be secured. Thus, the clamping plates 32 can be secured at one of a plurality of locations on their respective arms 16, 18. Since the clamping plates 32 can be located at various positions on their respective arms 16, 18, the position of the engine 12 can likewise be adjusted along the lengthwise dimension of the arms 16, 18. In this manner, a proper balance between the engine 12 and a model airplane can be easily attained. Also, since the clamping plates 32 extend over a broad surface area, minor adjustments of the position of flanges 38 which respect to the clamping plates 32 can be made. In this manner, sensitive adjustment of balance is easily attained.

As best seen in FIG. 3, when an engine 12 is supported on the mount 10, a space or clearance 39 is normally left between the flanges 38 and the surfaces 31. Because of space 39, the alignment of the engine 12 with the longitudinal dimension of an airplane to which it is mounted can be adjusted. The space 39 is generally sufficient to allow a five degree adjustment of the engine 12 to either the left or right. The space 39 also permits a variety of engines 12, which have flanges 38 with various widths, to be mounted on the arms 16, 18.

The present invention may be embodied in other specific forms without departing from the spirit or essential attributes thereof and, accordingly, reference should be made to the appended claims, rather than the foregoing specification as indicating the scope of the invention.

I claim:

1. A motor mount comprising:
a pair of arms extending outwardly from a mounting plate;
said arms extending in their lengthwise dimension generally perpendicularly from said mounting plate;
said arms being spaced from one another to form a slot for receiving a motor;
each arm having a generally horizontal surface for contacting flanges of a motor to be mounted thereon and an angled surface spaced above and sloping toward said horizontal surface; and
clamping means mounted on said angled surfaces and adapted for contacting upper surfaces of the flanges of the motor and for securing the flanges of the motor between said clamping means and said horizontal surfaces.

2. A motor mount in accordance with claim 1 wherein said arms and said mounting plate are integrally formed from a single piece of material.

3. A motor mount in accordance with claim 2 wherein said mounting plate has a centrally disposed hole therethrough and a plurality of smaller holes for receiving means for securing the motor mount to a surface.

4. A motor mount in accordance with claim 2 wherein said single piece of material is made of cast aluminum.

5. A motor mount in accordance with claim 1 wherein said arms extend generally parallel to one another.

6. A motor mount in accordance with claim 1 including a means for securing said clamping means to one of a plurality of locations along the lengthwise dimension of each arm.

7. A motor mount in accordance with claim 6 wherein said clamping means includes a plate member and said securing means includes a plurality of threaded holes through each arm adapted to receive fastening screws.

8. A motor mount for mounting a motor to a model airplane comprising:
a mounting plate having a centrally disposed hole for reducing the weight of the motor mount and a plurality of smaller holes for receiving means for fastening the motor mount to a model airplane;
a pair of spaced arms formed integrally with said mounting plate from a single piece of material and extending generally parallel to one another;
each arm having a generally horizontal support surface for supporting a flange of the motor and an angled surface spaced above and sloping toward said horizontal surface;
a clamping plate removably secured to each angled surface for clamping flanges of the motor between said plates and said horizontal surfaces; and
each arm having a plurality of threaded holes extending into said angled surface for securing said clamping plates to one of a plurality of positions along the longitudinal dimension of each arm.

9. A motor mount in accordance with claim 8 wherein said single piece of material is comprised of cast aluminum.

10. A motor mount in accordance with claim 8 wherein the cross sectional area of each arm decreases in a direction extending away from said mounting plate.

11. A motor mount for mounting a motor to a model airplane comprising:
a mounting plate having a centrally disposed hole for reducing the weight of the motor mount and a plurality of smaller holes for receiving means for fastening the motor mount to a model airplane;
a pair of spaced arms formed integrally with said mounting plate from a single piece of material and extending generally parallel to one another;
each arm having a generally horizontal support surface for supporting a flange of the motor; and each arm having an angled surface spaced above and sloping toward said horizontal surface; and
means for securing said flanges of various sized motors to said arms, said securing means being mounted to said angled surfaces, said securing means allowing various thickness of flanges to be secured to said arms and permitting the position of said flanges to be adjusted toward and away from said mounting plate.

* * * * *